United States Patent
Bedrine et al.

(10) Patent No.: US 9,422,863 B2
(45) Date of Patent: Aug. 23, 2016

(54) METHOD AND ARCHITECTURE FOR RECOMBINING THE POWER OF A TURBOMACHINE

(75) Inventors: Olivier Bedrine, Bosdarros (FR); Patrick Marconi, Gelos (FR); Alphonse Puerto, Lacq (FR)

(73) Assignee: TURBOMECA, Bordes (FR)

( * ) Notice: Subject to any disclaimer, the term of this patent is extended or adjusted under 35 U.S.C. 154(b) by 813 days.

(21) Appl. No.: 13/807,143

(22) PCT Filed: Jul. 5, 2011

(86) PCT No.: PCT/FR2011/051585
§ 371 (c)(1),
(2), (4) Date: Dec. 27, 2012

(87) PCT Pub. No.: WO2012/004516
PCT Pub. Date: Jan. 12, 2012

(65) Prior Publication Data
US 2013/0098052 A1    Apr. 25, 2013

(30) Foreign Application Priority Data

Jul. 6, 2010  (FR) ..................................... 10 55460

(51) Int. Cl.
| | |
|---|---|
| *F02C 1/04* | (2006.01) |
| *F02C 6/02* | (2006.01) |
| *F02C 7/36* | (2006.01) |
| *F02C 6/00* | (2006.01) |
| *F02C 7/10* | (2006.01) |

(52) U.S. Cl.
CPC ... *F02C 6/00* (2013.01); *F02C 1/04* (2013.01); *F02C 6/02* (2013.01); *F02C 7/36* (2013.01); *F02C 7/10* (2013.01); *Y02E 20/14* (2013.01); *Y02T 50/671* (2013.01)

(58) Field of Classification Search
CPC ................ F02C 1/04; F02C 6/02; F02C 7/10; F02C 7/36; F02C 6/00
See application file for complete search history.

(56) References Cited

U.S. PATENT DOCUMENTS

| | | |
|---|---|---|
| 2,814,181 A | 11/1957 | Schwartz |
| 4,147,024 A | 4/1979 | Moellmann |

(Continued)

FOREIGN PATENT DOCUMENTS

FR    1 339 734    10/1963

OTHER PUBLICATIONS

International Search Report Issued Sep. 9, 2011 in PCT/FR11/051585 Filed Jul. 5, 2011.

*Primary Examiner* — Gerald L Sung
*Assistant Examiner* — Scott Walthour
(74) *Attorney, Agent, or Firm* — Oblon, McClelland, Maier & Neustadt, L.L.P.

(57) ABSTRACT

A method and architecture for recombining power of a turbomachine improving on problems of size, mass, or reliability. In the method energy is recovered in an exhaust nozzle and converted and recirculated using a mechanical and/or electrical power recombining mechanism. An example of an architecture of a turbomachine includes a main turbine engine and a heat exchanger positioned in the exhaust nozzle and coupled, via pipes, to an independent system that converts thermal energy into mechanical energy. This independent system is connected to a localized mechanical recombination mechanism via a power shaft to supply power to a power transmission shaft according to aircraft requirements.

9 Claims, 7 Drawing Sheets

(56) References Cited

U.S. PATENT DOCUMENTS

| | | |
|---|---|---|
| 4,896,499 A | 1/1990 | Rice |
| 2004/0257840 A1 | 12/2004 | Brasz et al. |
| 2006/0034054 A1 | 2/2006 | Brasz et al. |
| 2010/0013223 A1* | 1/2010 | Certain .............. B60K 6/24 290/31 |
| 2010/0089023 A1 | 4/2010 | Harada |
| 2011/0146225 A1 | 6/2011 | Harada |

* cited by examiner

METHOD AND ARCHITECTURE FOR RECOMBINING THE POWER OF A TURBOMACHINE

TECHNICAL FIELD

The invention relates to a method for recombining power supplied by a turbomachine, as well as to the architecture of a turbomachine for the implementation of such a method.

A turbomachine is defined herein as being an aeronautical machine, known as a gas turbine, capable of supplying power to a shaft. Generally, turboshaft engines (helicopter engines, auxiliary power units hereinafter called APU) and turboprops (planes, drones) are to be found in this category.

Typically, a basic conformation of an aircraft turbomachine includes as essential constituents of revolution, arranged along the same main line: an air inlet, at least one air compressor, a gas combustion chamber, at least one high pressure turbine (below, HP) for driving the compressor(s) by means of a HP shaft, at least one power turbine, which can be a connected and/or free power turbine (below, TL) for converting energy available after the HP turbine into mechanical energy, and a gas exhaust nozzle. According to conformations adapted to the architectures, the power turbines can also be arranged along axes of rotation outside the so-called main line.

The mechanical energy supplied by the TL turbine via a power shaft drives payloads, via transmission shafts and reduction gears according to conformations: a helicopter rotor, a turboprop propeller, as well as the equipments (alternator, injector, pump, supercharger, hydraulic pump, etc.).

The progress achieved in the organs and parts, in their structure as well as in the material they are made of or the way they are combined, have substantially improved the energy efficiency of these machines. Another approach to the increase of this efficiency, the so-called energy approach, consists in reducing the loss of energy related to the temperature of exhaust gases which is not converted.

STATE OF THE ART

The energy approach is at present being developed according to two paths, known as cogeneration and regeneration:
  cogeneration consists in recovering energy in various forms and optimized locations, recovery being simultaneously achieved using at least two of the following modes of recovery: electric energy by means of an alternator coupled to the power shaft, air pressure energy by taking compressed air downstream from the compressor, and heat energy by means of a heat exchanger in the exhaust nozzle;
  regeneration aims at warming the compressed air before it enters the combustion chamber, i.e. by taking calories in the exhaust by means of a heat exchanger through which the stream of compressed air and the stream of exhaust gases flow.

Cogeneration improves the global efficiency of the installation but remains applied to industrial gas turbines because of the size and mass of the necessary means of energy conversion. Besides, regeneration also raises the problem of the size of the heat exchanger and the disadvantageous mass of the system. Furthermore, the reliability of the heat exchanger is not certain because of the severe environmental conditions (temperature, vibrations, manoeuvering loads, etc.), which could directly affect the engine.

DISCLOSURE OF THE INVENTION

The invention is part of the energy approach and aims at freeing oneself from the problems found above, notably size, mass and reliability. To do this, energy is recovered in the exhaust nozzle, converted and appropriately added to the turbomachine.

More precisely, the object of the present invention is a method for recombining power supplied by an aircraft turbomachine having a basic conformation of the above described type, including at least a gas generator, a power turbine and an exhaust nozzle. In this method, energy is recovered by means of a heat exchange in the exhaust nozzle; this recovered energy is then converted into mechanical energy form by an independent system, and the converted energy is recombined with the energy supplied by the turbomachine in a single zone, the recombination, of a mechanical or electric nature, being achieved by ways of a corresponding connection to a drive-shaft of the gas generator and to a power shaft of the power turbine and dedicated to the supply of mechanical and/or electric power according to the turbomachine and aircraft operation requirements.

According to particular embodiments:
  Recombination is achieved in a zone selected among an upstream zone (Z1), a downstream zone (Z2), a main transmission zone (3) and a zone for the global grouping of the power transmission means;
  Recombination is of mechanical nature and is achieved on a power transmission shaft of the turbomachine through a connection selected among a power curtailment, an additional connection and a connection to auxiliary equipments and a main transmission, according to the conformation of the turbomachine; advantageously, a single interface with the aircraft is thus arranged to supply mechanical power requirements;
  Recombination is of mechanical or electric nature and is achieved by connection to the HP drive-shaft of the gas generator for running phases of the turbomachine, in particular for transient phases or short durations during stabilized phases, and to the power shaft of the power turbine for complementary time durations;
  Recombination is of electric nature and achieved by conversion of the recovered energy into electric energy into an on-board network of the aircraft and/or to auxiliary equipments of the turbomachine and/or by electrical motorization in order to drive aircraft equipments.

In the case of an aircraft equipped with several turbomachines, multi-engine environment as it is called, the recombination method uses an independent system for energy conversion positioned at one of the engines or common to the engines and recovers the energy of the engines by means of heat exchangers mounted in series in the nozzles of the engines.

The invention also relates to an architecture of a turbomachine for implementing this method. Such an architecture, of the above described type, includes a heat exchanger positioned in the exhaust nozzle and coupled to an independent system for converting thermal energy into mechanical energy. This independent system is connected to mechanical and/or electrical recombination means located in a single zone according to the conformation of the turbomachine, the recombination means are capable of transmitting the power supplied by the independent system to the HP drive-shaft of the gas generator and to the power shaft of the power turbine, to meet the corresponding mechanical and/or electrical requirements of the turbomachine and aircraft.

According to particular embodiments:
  the independent system for energy conversion can be disconnected by ways of releasing means selected among a claw, a weakened zone, in particular a weak link, and a free wheel;

- the independent system is an open-cycle auxiliary heat engine, in particular a turboshaft engine with free or connected power turbine—i.e. with a single shaft—in which the combustion chamber is replaced with a heat exchanger;
- the independent system is a phase-change fluid motor including a condenser, a pump and a driving expansion organ of kinetic (turbine) or volumetric (pistons, vanes, etc.) type;
- the independent system is a piston open-cycle air engine working according to a two or four-strokes cycle, coupled to the heat exchanger;
- the power turbine is connected to the independent system, with the mechanical and/or electrical recombination means;
- the power shaft can be an upstream through shaft (30), this shaft and the power shaft (15) of the independent system (16) being coupled via mechanical recombination means, constituting a single mechanical interface for the aircraft; these means are selected among a power reduction gear, a main gearbox, an auxiliary equipment box and an additional box;
- the power shaft can be a downstream non-through shaft capable of transmitting, either directly or by coupling to an outside power shaft parallel to the main line, power to the aircraft either downstream or upstream respectively, the downstream non-through shaft and the power shaft of the independent system being coupled via mechanical recombination means, constituting a single mechanical interface for the aircraft; these recombination means are selected among a power reduction gear, a main gearbox and an additional box for adaptation to the basic conformation; this last option is advantageously used for a complex integration, in particular in the case of a direct-drive engine with an axial air inlet;
- coupling between the independent system and the recombination means can be achieved by means of a shaft or by direct "flanging" to these recombination means;
- the mechanical and electrical recombination means are capable of transmitting the power supplied by the independent system to the HP shaft of the gas generator for running phases of the turbomachine and to the power shaft of the power turbine for complementary time durations;
- the recombination means are electrical and constituted by an alternator coupled directly to the on-board network of the aircraft or via an electric motor for driving aircraft equipments.

In the case of an aircraft equipped with several turbomachines, a multi-engine environment as it is called, a multi-engine architecture uses an independent system for energy conversion positioned at a single engine or common to engines and recovering the energy of the engines by means of heat exchangers mounted in series in the engine nozzles. The mechanical recombination means are achieved by a recombination with the various engines or directly with a main gearbox to which the power shafts of the engines are coupled and the electrical recombination means are achieved by coupling to an alternator which feeds the aircraft on-board network.

BRIEF DESCRIPTION OF THE DRAWINGS

Other aspects, characteristics and advantages of the invention will appear in the following non-restrictive description relative to particular embodiments which refers to the annexed drawings representing respectively.

DETAILED DESCRIPTION OF EMBODIMENTS

In the following description, the terms upstream and downstream—front and rear respectively—are associated to locations with regard to the gas generator according to the oriented axis XX along the main line. Besides, in all Figs., identical or similar elements having the same function are identified with identical reference marks.

Figure 1:
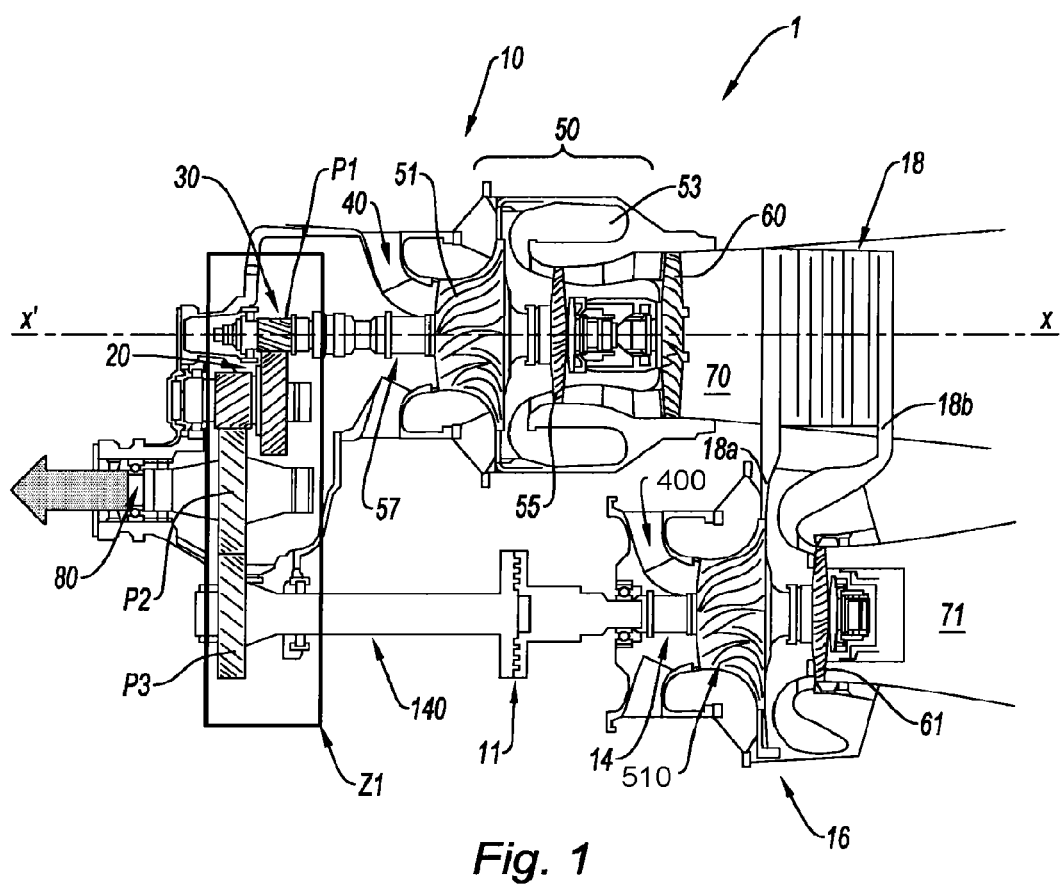
in FIG. 1, a schematic sectional view of an example of an architecture of a main turboshaft engine with a through shaft, an upstream reduction gear and, as an independent system, a modified turboshaft engine with a disconnection claw.

With reference to FIG. 1, the schematic sectional view of an architecture according to the invention illustrates a front location Z1 for recombining the power with a power reduction gear 20. In this example, main turboshaft engine 1 has a through-going power shaft 30 engaged by ways of a pinion P1 with power reduction gear 20 arranged upstream with regard to a gas generator 50. Typically, basic conformation 10 of such a turboshaft engine includes, as solids of revolution around axis X'X: a radial air inlet 40, a centrifugal air compressor 51, a gas combustion chamber 53, a HP turbine 55—which converts a part of the kinetic energy originating in the combustion of the gases (mixture of compressed air and fuel) in chamber 53 into mechanical energy, in order to drive compressor 51 by means of a HP shaft 57—, a power turbine 60 and an exhaust nozzle 70 for the residual gases.

In the illustrated example, the chain—compression (by centrifugal compressor 51), combustion (in combustion chamber 53) and expansion (by means of HP turbine 55)—forms gas generator 50, and power turbine 60 is a free power turbine named TL. In other examples, one or several connected or free power turbines can also take part in power generation.

Turbine TL 60 converts the residual kinetic energy stemming from gas generator 50 into mechanical energy. This mechanical energy is delivered to the payloads (rotor, equipments, auxiliary equipments, etc.) via through-going power shaft 30, reduction gear 20, and a power transmission shaft 80 engaged at the level of pinion P2 of reduction gear 20.

More precisely, power recombination is carried out by the upstream shaft engagement via pinion P3 of a power shaft 140 originating in an auxiliary turboshaft engine 16 which constitute here the independent system according to the invention. This turboshaft engine is an open-cycle heat engine with radial air inlet 400, compressor 510, connected power turbine 61 and single shaft 14.

Here, the gas generator of this turboshaft engine is formed by: compression of air in compressor 51; recovery of heat made by transferring the so compressed air—via an inlet pipe 18a—into a heat exchanger 18 arranged in exhaust nozzle 70 of turboshaft engine 1; and expansion of the air through turbine 61 of auxiliary turboshaft engine 16. Pipes 18a and 18b as well as heat exchanger 18 appear in most of the annexed Figs. (except for FIGS. 2a, 2b and 8).

This turboshaft engine is modified in that its combustion chamber is replaced with heat exchanger 18. Furthermore, its auxiliary equipment box is simplified by removal of the fuel system. The air, expanded and cold, is evacuated into nozzle 71.

The thermal energy recovered in nozzle 70 is thus converted into mechanical energy by independent turboshaft engine 16 and added into main turboshaft engine 1 by ways of the power recombination located in Z1, through the engagement pinions of power shafts 14 and 30. So, an additional power is made available at shaft 80 according to requirements.

Power shaft 14 of independent turboshaft engine 16 is mounted via a toothed claw 11 and an auxiliary shaft 140 in upstream engagement by means of pinion P3. This toothed claw makes it possible to disconnect turboshaft engine 16 from turboshaft engine 1 in case of malfunction of the former, which ensures independence of the turboshaft engine.

Figure 2A:
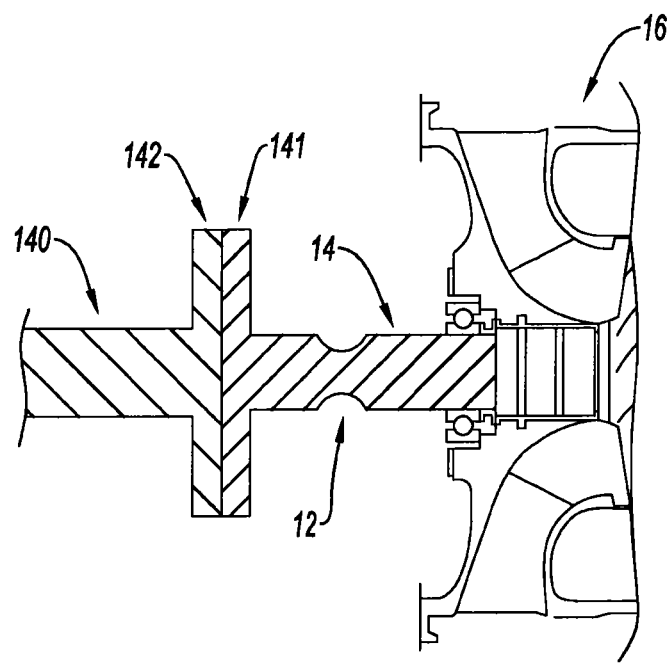
in FIGS. 2*a* and 2*b*, two schematic sectional views of substitutes for the means of disconnection of the independent system according to FIG. 1, namely with a weak link and a freewheel respectively.
Figure 2B:
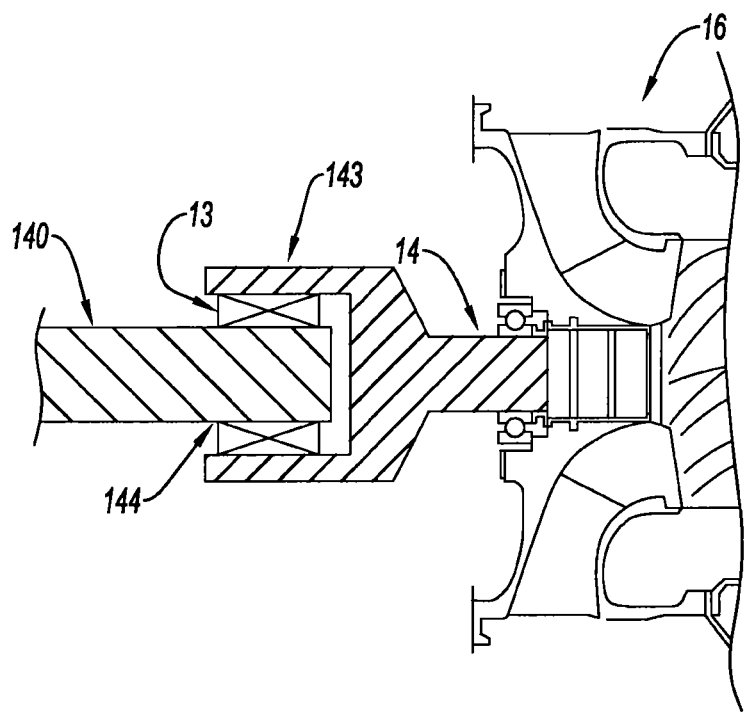

With reference to FIGS. 2a and 2b, two substitutes for the claw as a means of disconnection, having an equivalent function, are illustrated:

in FIG. 2a, power shaft 14 of turboshaft engine 1 (partial view) presents a weak link 12, shaft 14 and auxiliary shaft 140 will thus be disconnected only in case of malfunction of turboshaft engine 16; a connection from stiff to flexible, making misalignments possible, is achieved by means of two flanges 141 and 142;

in FIG. 2b, opposed extremities 143 and 144, of power shaft 14 and auxiliary shaft 140 respectively, form the tracks of a freewheel bearing 13 achieving a disengaging driving coupling between these shafts.

Besides auxiliary turboshaft engine 16, the independent system can be, more generally: an open-cycle auxiliary heat engine with one or several free or connected power turbines—i.e. with a single shaft—in which the combustion chamber is modified in order to be coupled to the heat exchanger of the main turbomachine; a phase-change fluid motor including in particular a condenser, a pump and a compressor; or also a piston open-cycle engine working according to a two or four-strokes cycle, also coupled to the heat exchanger.

The power shaft for the power supplied by main turboshaft engine 1 can be an outside and thus non-through shaft. In that case, which is illustrated in the schematic views of FIGS. 3a and 3b, engagement pinion P1 of non-through power shaft 31 and reduction gear 20 are in downstream position. Independent system 16 is recombined directly by means of the reduction gear (FIG. 3a) or by means of an additional box 90 added on turboshaft engine 1 (FIG. 3b).

Figure 3A:
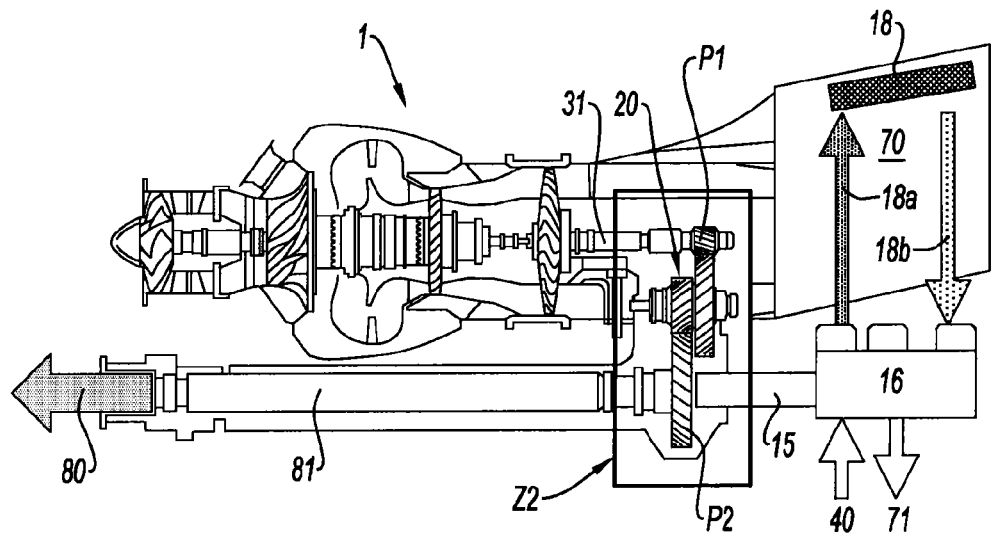
in FIGS. 3*a* and 3*b*, schematized sectional views of exemplary architectures according to the invention with downstream outside power shaft and reduction gear, the independent system being recombined either downstream by means of the reduction gear (FIG. 3*a*) or upstream by means of an additional box (FIG. 3*b*) respectively.
Figure 3B:
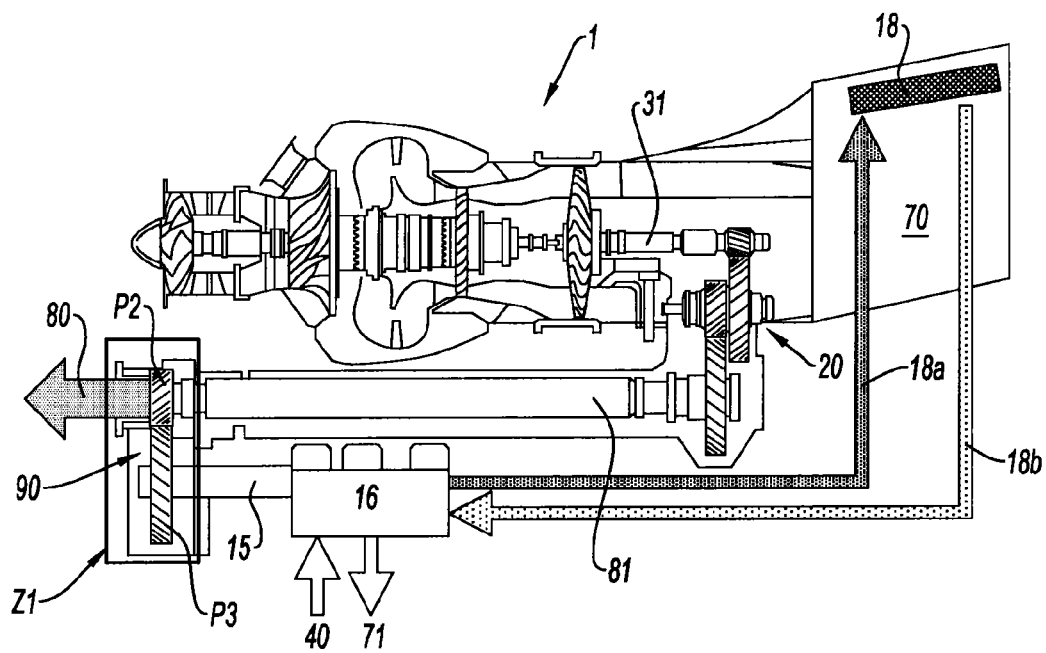

In FIG. 3a, power shaft 15 encompasses shafts 14 and 140 as well as one of the previous connection systems (claw 11, weak link 12, alignment flanges 141, 142 and freewheel 143). This shaft 15 is advantageously in colinear connection with an outside power shaft 81 and power transmission shaft 80, behind its engagement pinion P2 with reduction gear 20. Power recombination zone Z2 is located downstream. In FIG. 3b, the outside shaft for available power 81 and power shaft 15 of independent system 16 are connected via pinions P2 and P3 in additional box of connection 90. Recombination zone Z1 is then upstream.

Figure 4A:
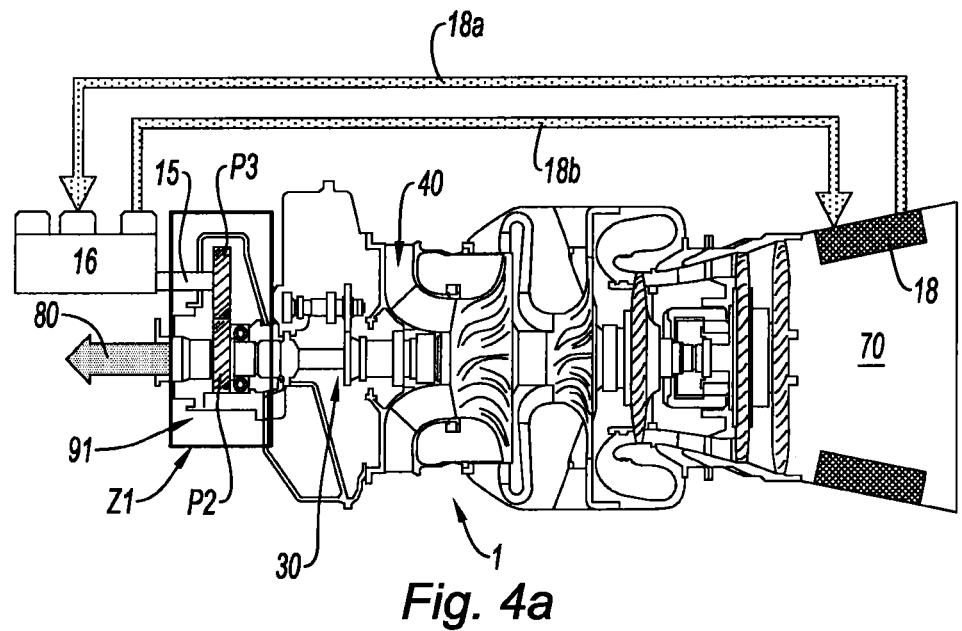
in FIGS. 4*a* and 4*b*, schematic sectional views of exemplary architectures according to the invention with direct-drive through shaft (without a reduction gear), the air inlet being radial and axial respectively and the independent system being recombined by means of the auxiliary box and an additional box respectively.
Figure 4B:
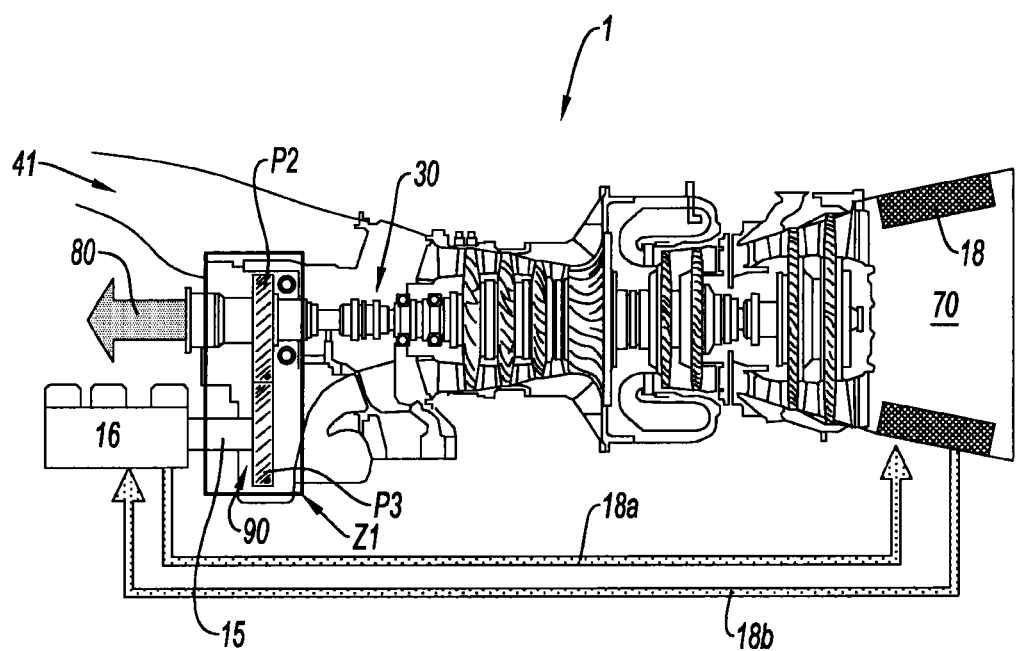

In another conformation, the turboshaft engine has a through shaft without a reduction gear, i.e. with an upstream direct drive. In these conditions, through shaft 30 is directly coupled to power transmission shaft 80 and power recombination is achieved upstream. FIGS. 4a and 4b show such an upstream recombination in zone Z1, by ways of pinions P2 and P3, according to schematic sections. With a radial air inlet 40 (FIG. 4a), it is possible to recombine the power of shaft 15 at the level of auxiliary equipment box 91 of the turboshaft engine. This auxiliary equipment box makes possible a connection to the auxiliary equipments of the turboshaft engine (injectors, sensors, etc.) and to the equipments of the aircraft (alternator, pump, etc.). With an axial air inlet 41 (FIG. 4b), it is advantageous to integrate an additional box 90 in order to adapt more easily to the conformation by means of an appropriate mechanism (pinions, reduction gear bevel gears, etc.).

Figure 5:
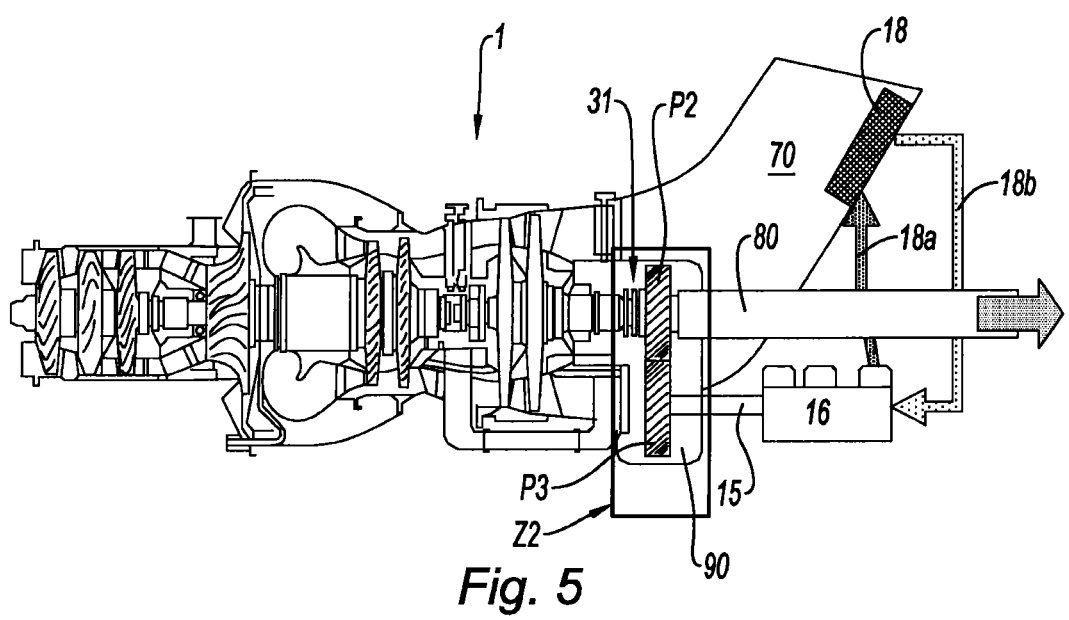
in FIG. 5, a schematic sectional view of an example of an architecture according to the invention with a non-through shaft with downstream direct drive and additional box for power recombination.

In FIG. 5, the direct drive (without a reduction gear) is achieved downstream, on non-through power shaft 31 which is directly coupled to power transmission shaft 80. Similarly to the previous case (FIG. 4b), pinions P2 and P3 of an additional box 90 constitute a take-off of power coming from independent system 16 and recombine shaft 15 with non-through power shaft 31 which supplies the available power via shaft 80. In that case, power recombination zone Z2 is located downstream.

In the previous exemplary architectures, power recombination made it possible to define a transmission shaft for the available power as the sole mechanical interface with the aircraft to meet the global power requirements. In these conformations, the mechanical power delivered by independent system 16 is recombined with that of turboshaft engine 1 through a power shaft 15—via shafts 14 and 140—, a reduction gear 20, an additional box 90 or auxiliary box 91. Alternately, independent system 16 can be "flanged", i.e. directly fixed, to the various recombination means above, thus freeing oneself from power shafts 14 and 140 (FIG. 1).

The level of available power reached reflects the supply capacities of independent system 16 and turboshaft engine 1. It is advantageous, in term of energy balance, to use first and foremost—if not exclusively—the power supplied by the independent system through the mechanical interface, in order to optimize the global efficiency of the complete architecture "turboshaft engine and independent device".

Figure 6:
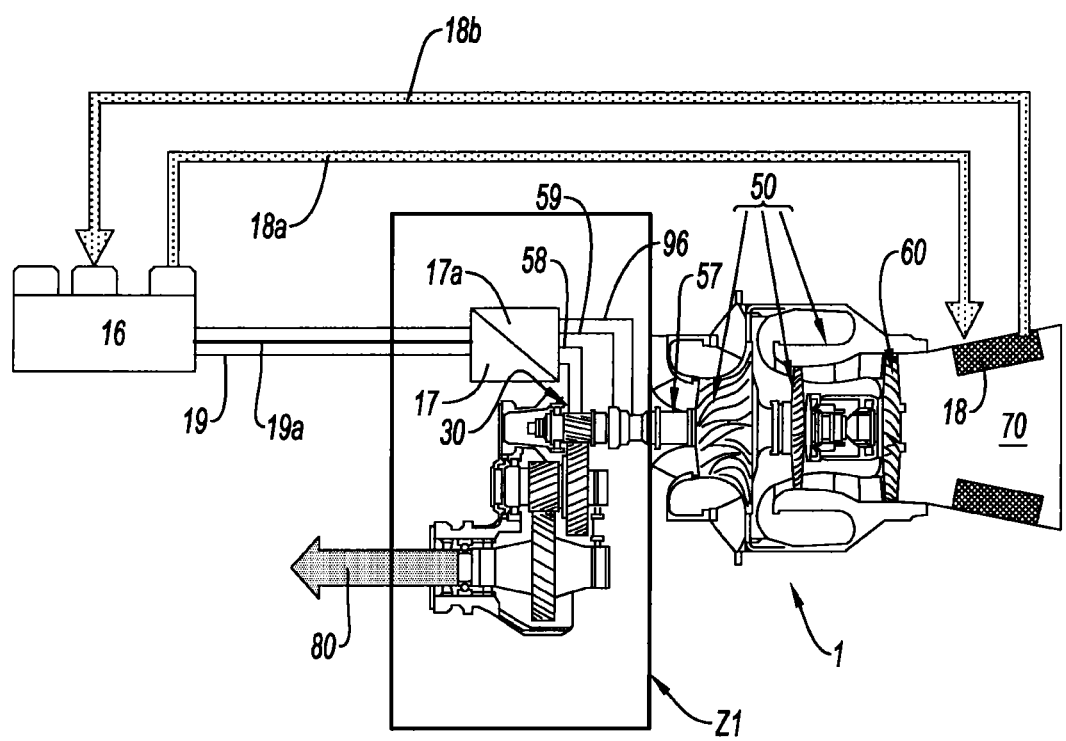
in FIG. 6, a schematic sectional view of an example of an architecture according to the invention with power recombination with the HP and TL shafts via a mechanical or electric connection.

In other conformations, it can be useful to connect independent system 16 to at least one of the HP and/or power shafts of the turboshaft engine, i.e., more generally, to a gas generator, for instance generator 50 illustrated in FIG. 6. So, the schematic sectional view of the exemplary architecture illustrated with this FIG. 6 shows the power transmission delivered by independent system 16 to HP 57 and through-going 30 shafts, via a shaft 19 and a mechanical double transmission system 17. This system directs, according to requirements defined by the management module of the aircraft, the power delivered by independent system 16 towards transmission shafts 58 or 59 mounted on system 17. These shafts 58 and 59 drive through-going power shaft 30 and HP shaft 57 respectively via pinions and appropriate bevel gears 96. The power recombination is then made at the level of these pinions, in upstream zone Z1.

For instance, for transient or short-duration phases during stabilized phases, a surplus of power is added by shaft 59 to HP shaft 57 and, for complementary time durations, a surplus of power is added by shaft 58 to through shaft 30.

Alternately, in a variant of electric recombination, based on a conversion of mechanical energy supplied by the independent system into electric energy by means of an electric generator—advantageously integrated in the independent system—, a power transmission cable 19*a* and an electric motor 17*a* drive shafts 58 and 59 according to requirements, depending on instructions supplied by a control unit of the management module.

Figure 7:
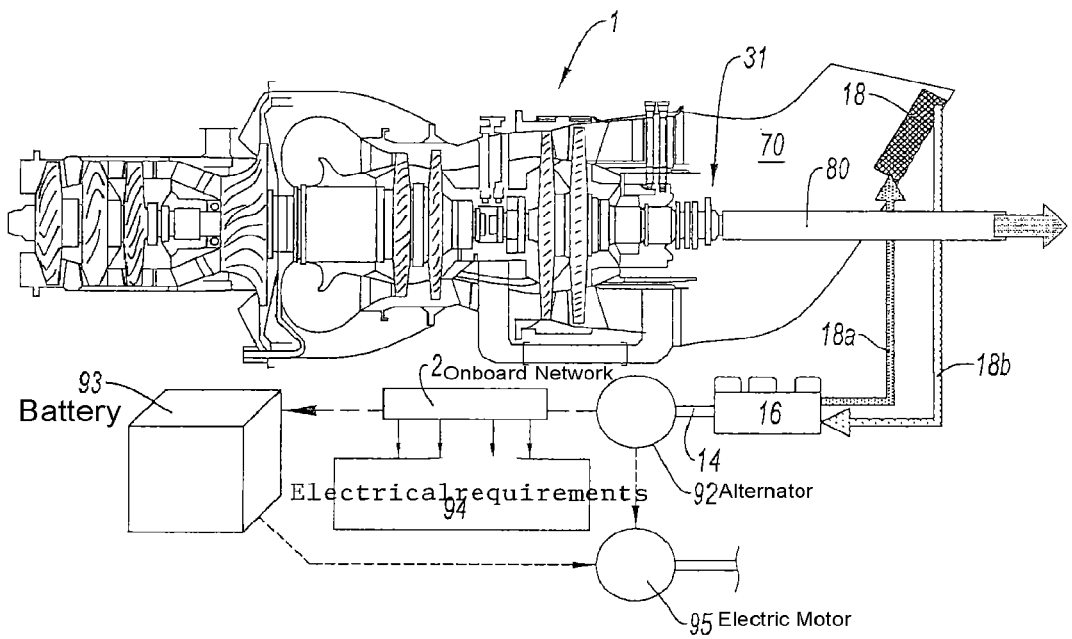
in FIG. 7, a schematic sectional view of an example of an architecture according to the invention with an independent system connected to the on-board network via an alternator as a means for recombining electric power.

Electric conversion of the power supplied by the independent system can also be used directly by the on-board network or the equipments of the turboshaft engine. The schematic sectional view of FIG. 7 illustrates a corresponding exemplary architecture. In this architecture, turboshaft engine 1 is equipped with a downstream non-through power shaft 31, without a reduction gear, and independent system 16 is connected to an alternator 92 via shaft 14, the alternator charging a battery 93. The alternator is then capable of supplying electric power to on-board network 2 of the aircraft according to electrical requirements 94. The on-board network is fed also by the turboshaft engine or by generators on the main gearbox. It then carries out the power recombination function. As seen previously for efficiency reasons, the power which is used is first and foremost that supplied by independent system 16 via alternator 92. A part of this electric power, coming from alternator 92 and/or battery 93 can also be used via an electric motor 95. This motor makes it possible to drive some equipments of the aircraft (pumps, alternators, supercharger . . . ), auxiliary equipments of the turboshaft engine (pumps, etc.), or to produce an additional power supply for certain running phases of the turboshaft engine, for instance for the transient acceleration phases of the turboshaft engine.

Advantageously, the use of the recombination power in electric form offers a flexibility of integration into the architecture of the engine. In particular, this electrical solution can apply in the case of turbomachines architectures where mechanical recombination has only a reduced space, for instance in architectures without a reduction gear.

Figure 8:
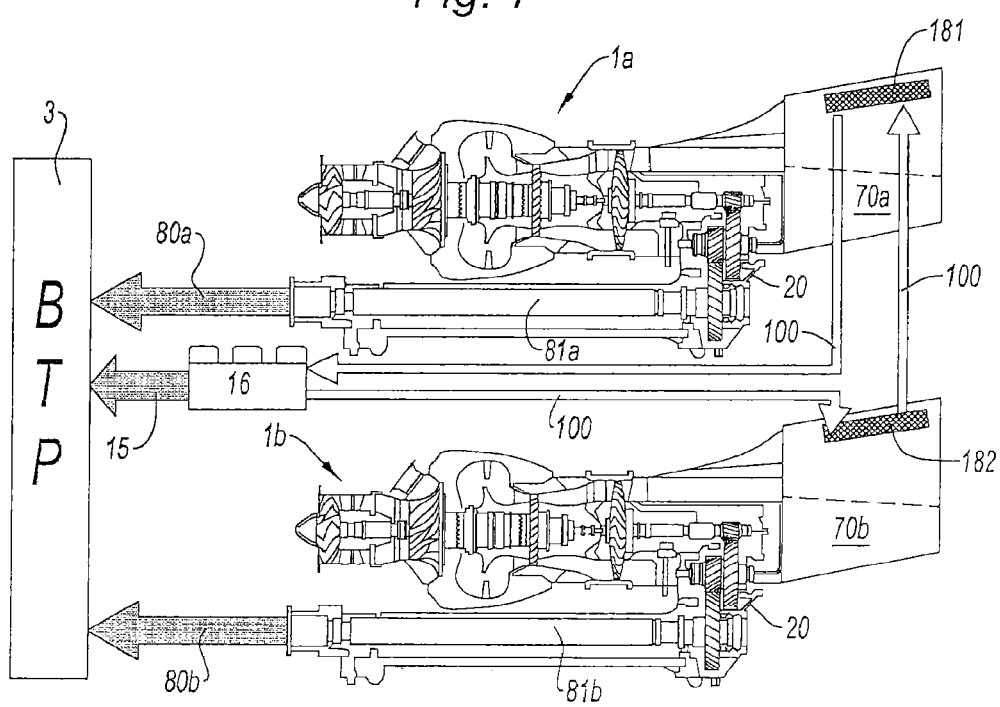
in FIG. 8, a schematic sectional view of an example of an architecture in a bi-turboshaft engine environment with in-series heat exchangers and power recombination with the main transmission box.

In case of multi-engine architecture, the location of independent system 16 can be either integrated into one turbomachine according to the previously illustrated conformations or shared between all the turbomachines. The schematic sectional view of FIG. 8 illustrates such a conformation for an architecture with a bi-turboshaft engine environment 1*a* and 1*b*. Independent system 16 recovers the thermal energy by ways of a pipe 100 connecting in series heat exchangers 181 and 182 positioned in exhaust nozzles 70*a* and 70*b* of turboshaft engines 1*a* and 1*b* respectively. The mechanical power supplied to shaft 15 at the output of independent system 16 is directly recombined by ways of main gearbox BTP 3 with power transmission shafts 80*a* and 80*b* of the turboshaft engines (in connection, in this example, with outside power shafts 81*a* and 81*b* respectively).

Figure 9:
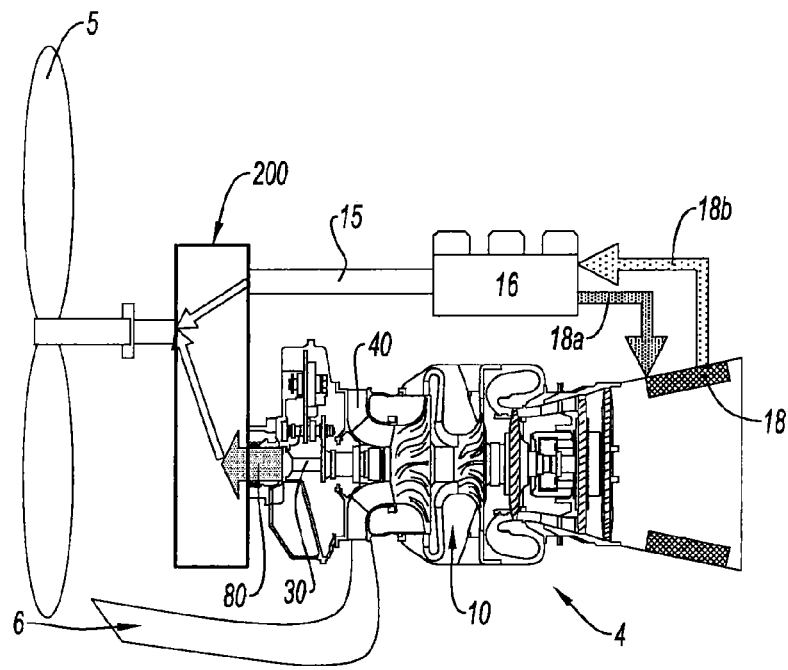
in FIG. 9, a schematic sectional view of an example of an architecture of a turboprop with a propeller reduction gear as a power recombination means; and in FIG. 10, a schematic sectional view of an example of an architecture of an APU with an auxiliary equipment box as a power recombination means.

The present invention is not limited to the architectures with turboshaft engines of the previous examples, but it can extend to any turbomachine. The schematic sectional view of FIG. 9 illustrates, as an example, an architecture of a turboprop 4. This turboprop includes in particular a reduction gear 200 of a propeller 5, as a recombination means of power shaft 15 of the independent system with transmission shaft 80 for the available power supplied by through shaft 30 of a basic conformation 10. Alternately, independent system 16 is flanged to power reduction gear 200 without a transmission shaft 14 and/or 140 (FIG. 1). Turboprop 4 also has an axial air duct 6 connected to radial air inlet 40 of basic conformation 10.

Figure 10:
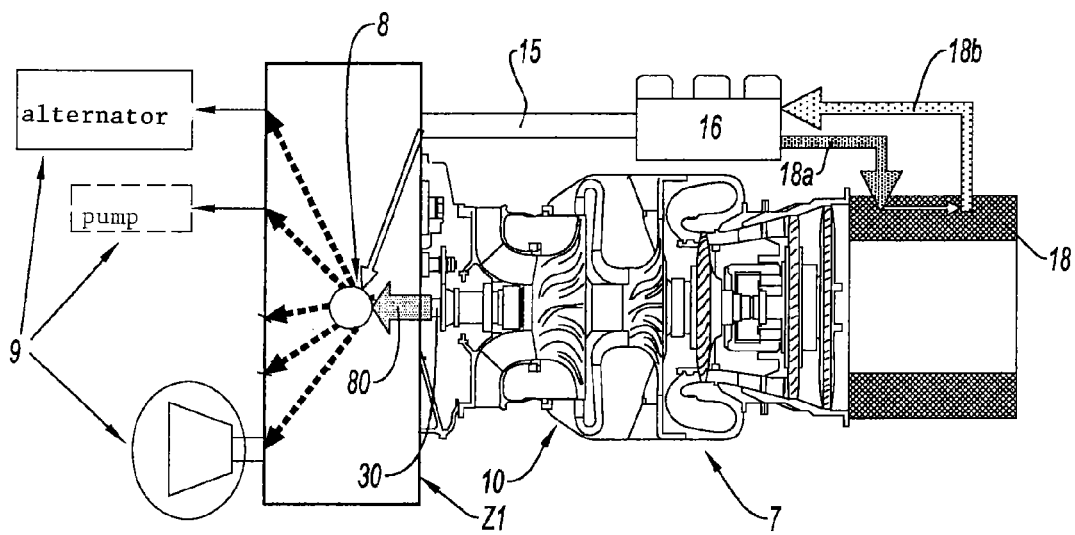

FIG. 10 is a schematic sectional view of another type of turbomachine architecture, i.e. the architecture of an APU 7. Basic conformation 10 of such an APU includes a through shaft 30 which supplies all its power via transmission shaft 80 to an auxiliary equipment box 8 connected to this shaft 30 in an upstream zone Z1. Auxiliary equipment box 8 drives the engine auxiliary equipments of APU 7 and auxiliary equipments 9 specific to the operation of the aircraft: alternator, injector, pump, load compressor, hydraulic pump, etc. Via power shaft 15, independent system 16 is also connected to this auxiliary equipment box 8 which serves as power recombination means. Alternately, independent system 16 is flanged to box 8 in order to free oneself from transmission shafts 14 and/or 140 (FIG. 1). The independent system can then supply an additional mechanical power which will be preferably used first and foremost, according to the operational requirements.

Other architecture conformations lie also within the scope of the present invention: independent system 16 can be connected to a reduction gear common to at least one turbomachine which incorporates all the transmissions, for instance to the helicopter rotor, to the turbomachine auxiliary equipments and to the aircraft equipments.

With the aim of obtaining a better integration, an independent system 16, one or several turbomachines and the reduction gear can also be integrated into the same assembly so as to pool certain functions (lubrication, common casing, cooling, air inlets . . . ) and to minimize the mass and size of the assembly.

Besides, not all the basic conformations are aligned along the same line or arranged in the same way. For instance, according to certain architectures, the turbines and/or the combustion chambers can be moved parallel to this line.

Furthermore, the power transmission can be achieved by means of a shaft 80 as in the illustrated examples or by ways of any other transmission means.

The invention claimed is:

1. A method for recombining power supplied by an aircraft turbomachine including at least a gas generator, a power turbine, and an exhaust nozzle, the method comprising:
   recovering thermal energy by heat exchange via a heat exchanger arranged in the exhaust nozzle;
   converting the recovered thermal energy from the heat exchanger into mechanical energy by an independent system, the independent system including a compressor, an inlet pipe feeding compressed air from the compressor to the heat exchanger to heat the compressed air, a connected power turbine connected to an outlet pipe of the heat exchanger and driven by the compressed air heated by the heat exchanger, and a power shaft driven by the connected power turbine; and recombining, via the power shaft of the independent system, the mechanical energy converted by the independent system from the heat exchanger with energy supplied by the aircraft turbomachine in a single zone of the aircraft turbomachine, the recombining being mechanical or electrical and achieved by a corresponding connection of the power shaft of the independent system to a drive-shaft of the gas generator and to a power shaft of the power turbine, the recombining being dedicated to supplying at least one of mechanical and electric power according to requirements of the aircraft turbomachine and operation requirements of an aircraft, wherein the independent system is free of a combustion chamber.

2. The method for recombining power according to claim 1, wherein the single zone is one of: an upstream zone of the aircraft turbomachine, a downstream zone of the aircraft turbomachine, a main transmission zone of the aircraft turbomachine, and a zone for global grouping of a power transmission of the aircraft turbomachine.

3. The method for recombining power according to claim 1, wherein the recombining is mechanical and the corresponding connection includes one of: a power curtailment, an additional connection, a connection to auxiliary equipment, and a main transmission.

4. The method for recombining power according to claim 1, wherein the recombining is electrical and is dedicated to supplying electric power to at least one of: an on-board network of the aircraft, auxiliary equipment of the aircraft turbomachine, and an electric motor for driving aircraft equipment.

5. The method for recombining power according to claim 1, in a multi-engine environment, the method further comprising:

recovering thermal energy from the aircraft turbomachine and at least one additional aircraft turbomachine by heat exchange via respective heat exchangers mounted in series, with respect to each other, in respective exhaust nozzles of each aircraft turbomachine.

6. An architecture for recombining power, comprising:

a turbomachine including a gas generator, a power turbine, an exhaust nozzle, and a heat exchanger positioned in the exhaust nozzle; and an independent system for converting thermal energy into mechanical energy coupled to the heat exchanger, the independent system including a compressor, an inlet pipe feeding compressed air from the compressor to the heat exchanger to heat the compressed air, a connected power turbine connected to an outlet pipe of the heat exchanger and driven by the compressed air heated by the heat exchanger, and a power shaft driven by the connected power turbine, wherein the power shaft of the independent system is connected to the turbomachine in a single zone of the turbomachine, the power shaft of the independent system being connected to a high pressure drive-shaft of the gas generator and to a power shaft of the power turbine to supply at least one of mechanical and electrical power according to requirements of the turbomachine and an aircraft, wherein the independent system is free of a combustion chamber.

7. The architecture for recombining power according to claim 6, wherein the power shaft of the power turbine is an upstream through shaft and the power shaft of the power turbine and the power shaft of the independent system are coupled via one of: a power reduction gear, a main gearbox, an auxiliary equipment box, and an additional box.

8. The architecture for recombining power according to claim 6, wherein the power shaft of the power turbine is a downstream non-through shaft capable of transmitting, either directly or by coupling to an outside power shaft parallel to a centerline of the turbomachine, power to the aircraft either downstream or upstream respectively, the downstream non-through shaft and the power shaft of the independent system being coupled via one of: a power reduction gear, a main gearbox, and an additional box.

9. The architecture for recombining power according to claim 6, further comprising an alternator coupled either directly to an on-board network of the aircraft or via an electric motor for driving aircraft equipment.

* * * * *